US010151219B2

(12) United States Patent
McKenney et al.

(10) Patent No.: US 10,151,219 B2
(45) Date of Patent: *Dec. 11, 2018

(54) GAS TURBINE ENGINE AND FRAME

(71) Applicant: Rolls-Royce North American Technologies, Inc., Indianapolis, IN (US)

(72) Inventors: Tony R. McKenney, Indianapolis, IN (US); David R. Price, Brownsburg, IN (US)

(73) Assignee: ROLLS-ROYCE NORTH AMERICAN TECHNOLOGIES INC., Indianapolis, IN (US)

( * ) Notice: Subject to any disclaimer, the term of this patent is extended or adjusted under 35 U.S.C. 154(b) by 416 days.

This patent is subject to a terminal disclaimer.

(21) Appl. No.: 14/958,789

(22) Filed: Dec. 3, 2015

(65) Prior Publication Data

US 2016/0130980 A1 May 12, 2016

Related U.S. Application Data

(63) Continuation of application No. 12/978,939, filed on Dec. 27, 2010, now Pat. No. 9,284,887.

(Continued)

(51) Int. Cl.
*F01D 25/26* (2006.01)
*F02C 7/20* (2006.01)
(Continued)

(52) U.S. Cl.
CPC .............. *F01D 25/26* (2013.01); *F01D 5/02* (2013.01); *F01D 17/105* (2013.01); *F01D 25/16* (2013.01);
(Continued)

(58) Field of Classification Search
CPC ........ F01D 25/16; F01D 25/164; F01D 25/24; F01D 25/28; F02C 7/20
See application file for complete search history.

(56) References Cited

U.S. PATENT DOCUMENTS 3,332,242 A 7/1967 Johnson
3,814,549 A 6/1974 Cronstedt
(Continued)

FOREIGN PATENT DOCUMENTS

CA 1111774 11/1981
EP 1803901 7/2007

OTHER PUBLICATIONS

High temperature resins based on allylamine/bismaleimides by King-fu Lin, Jin-Sing Lin and Chen-Hwa Cheng, Institute of Materials Science and Engineering, National Taiwan University, Taipei, Taiwan 10617, Republic of China.

(Continued)

*Primary Examiner* — Ninh H Nguyen
*Assistant Examiner* — Brian O Peters
(74) *Attorney, Agent, or Firm* — Brinks Gilson & Lione

(57) ABSTRACT

One embodiment of the present invention is a unique gas turbine engine. Another embodiment is a unique frame for a gas turbine engine. Other embodiments include apparatuses, systems, devices, hardware, methods, and combinations for gas turbine engines and gas turbine engine frames. Further embodiments, forms, features, aspects, benefits, and advantages of the present application shall become apparent from the description and figures provided herewith.

19 Claims, 4 Drawing Sheets

Related U.S. Application Data

(60) Provisional application No. 61/291,592, filed on Dec. 31, 2009.

(51) Int. Cl.

| | |
|---|---|
| *F01D 25/16* | (2006.01) |
| *F01D 25/24* | (2006.01) |
| *F01D 25/28* | (2006.01) |
| *F01D 5/02* | (2006.01) |
| *F01D 17/10* | (2006.01) |
| *F04D 29/32* | (2006.01) |

(52) U.S. Cl.
 CPC .......... *F01D 25/164* (2013.01); *F01D 25/24* (2013.01); *F01D 25/243* (2013.01); *F01D 25/28* (2013.01); *F02C 7/20* (2013.01); *F04D 29/321* (2013.01); *F05D 2220/32* (2013.01); *F05D 2240/24* (2013.01); *F05D 2260/941* (2013.01); *F05D 2300/10* (2013.01); *F05D 2300/224* (2013.01); *F05D 2300/48* (2013.01); *F05D 2300/603* (2013.01); *F05D 2300/6032* (2013.01); *F05D 2300/6033* (2013.01)

(56) References Cited

U.S. PATENT DOCUMENTS

| | | | |
|---|---|---|---|
| 4,180,371 A | 12/1979 | Ivanko | |
| 4,793,770 A | 12/1988 | Schonewald et al. | |
| 4,820,117 A | 4/1989 | Larabee et al. | |
| 5,251,435 A | 10/1993 | Pauley | |
| 5,272,869 A | 12/1993 | Dawson et al. | |
| 5,291,732 A | 3/1994 | Halila | |
| 5,291,733 A | 3/1994 | Halila | |
| 5,483,792 A | 1/1996 | Czachor et al. | |
| 5,887,822 A | 3/1999 | Thornock et al. | |
| 6,547,518 B1 | 4/2003 | Czachor et al. | |
| 6,619,030 B1 | 9/2003 | Serda et al. | |
| 6,662,567 B1 | 12/2003 | Jorgensen | |
| 6,708,482 B2 | 3/2004 | Seda | |
| 6,883,303 B1 | 4/2005 | Seda | |
| 7,114,917 B2 | 10/2006 | Legg | |
| 7,124,572 B2 | 10/2006 | Aycock et al. | |
| 7,338,244 B2 | 3/2008 | Glessner et al. | |
| 7,377,098 B2 | 5/2008 | Walker et al. | |
| 7,377,117 B2 | 5/2008 | Riggi, Jr. et al. | |
| 2003/0126854 A1 | 7/2003 | Cazenave et al. | |
| 2006/0010879 A1 | 1/2006 | Aumont et al. | |
| 2007/0231134 A1 | 10/2007 | Kumar et al. | |
| 2007/0261411 A1 | 11/2007 | Nagendra et al. | |
| 2007/0280819 A1 | 12/2007 | Eleftheriou et al. | |
| 2008/0022692 A1 | 1/2008 | Negendra et al. | |
| 2008/0131277 A1 | 6/2008 | Shatz et al. | |
| 2008/0135679 A1 | 6/2008 | Udall | |
| 2008/0159856 A1 | 7/2008 | Moniz et al. | |
| 2009/0175718 A1 | 7/2009 | Diaz et al. | |
| 2010/0111678 A1 | 5/2010 | Habarou et al. | |

OTHER PUBLICATIONS

European Search Report in corresponding European application (i.e., EP 10 841 685.0), dated Jan. 15, 2015, pp. 1-6.
International Search Report and Written Opinion, PCT/US2010/062381, Rolls-Royce North American Technologies, Inc., International Searching Authority/US, dated Apr. 6, 2011.

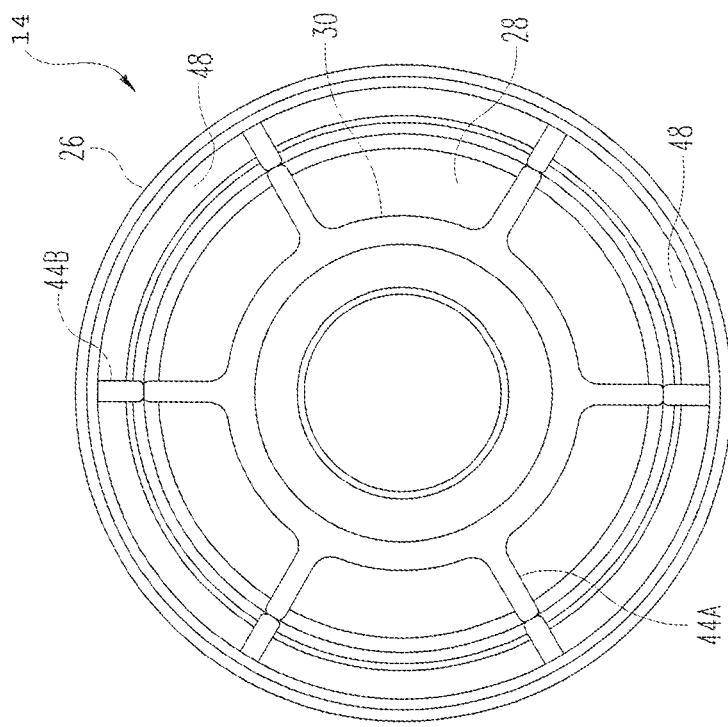
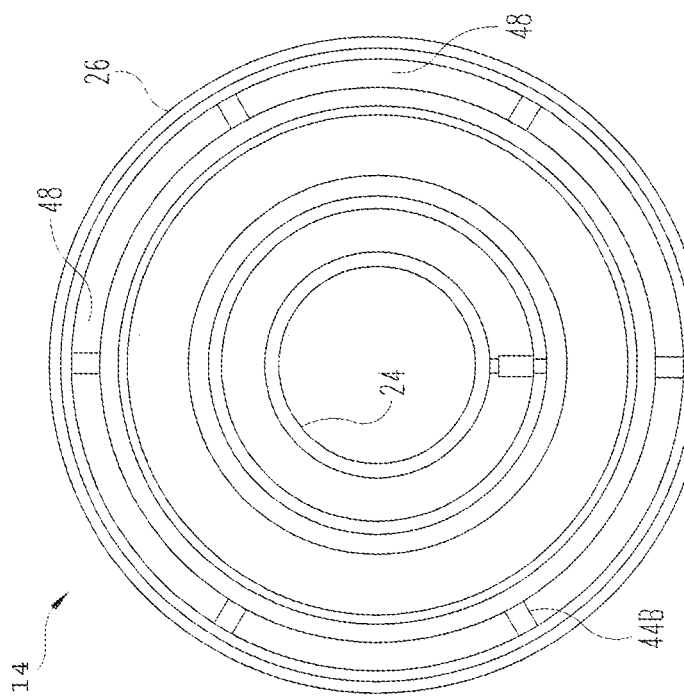

GAS TURBINE ENGINE AND FRAME

CROSS REFERENCE TO RELATED APPLICATIONS

This application is a continuation application of, and claims priority under 35 USC § 120 to, U.S. Non-Provisional application Ser. No. 12/978,939, "GAS TURBINE ENGINE AND FRAME" filed Dec. 27, 2010, the entire contents of which are incorporated by reference, which is a non-provisional application of, and claims priority under 35 USC § 119(e) to, U.S. Provisional Application 61/291,592, "GAS TURBINE ENGINE AND FRAME" filed Dec. 31, 2009, the entire contents of which are incorporated by reference.

GOVERNMENT RIGHTS

The present application was made with United States government support under Contract No. F33615-03-D-2357 awarded by the United States government. The United States government may have certain rights in the present application.

FIELD OF THE INVENTION

The present invention relates to gas turbine engines, and more particularly, to gas turbine engine frames.

BACKGROUND

Structures such as frames for gas turbine engines remain an area of interest. Some existing systems have various shortcomings, drawbacks, and disadvantages relative to certain applications. Accordingly, there remains a need for further contributions in this area of technology.

SUMMARY

One embodiment of the present invention is a unique gas turbine engine. Another embodiment is a unique frame for a gas turbine engine. Other embodiments include apparatuses, systems, devices, hardware, methods, and combinations for gas turbine engines and gas turbine engine frames. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein:

FIGS. 4A and 4B are end views of the intermediate frame of FIG. 2.

DETAILED DESCRIPTION

Figure 1:
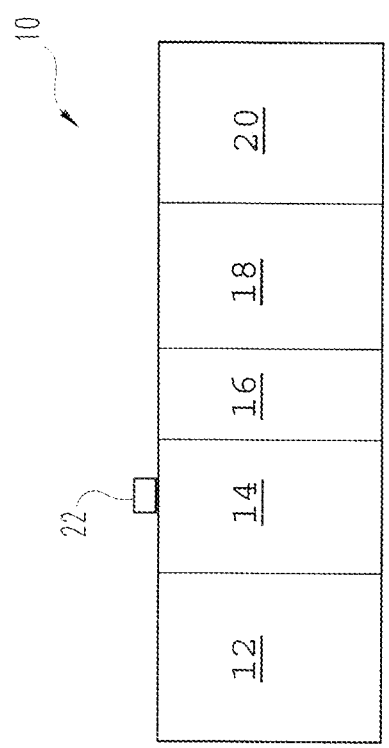
FIG. 1 schematically depicts a gas turbine engine having an intermediate frame in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to the drawings, and in particular, FIG. 1, a non-limiting example of a gas turbine engine 10 in accordance with an embodiment of the present invention is depicted. Engine 10 includes a fan system 12, an intermediate frame 14, a compressor system 16, a combustor 18 and a turbine system 20. In one form, engine 10 is a multi-spool engine. In other embodiments, engine 10 may be a single spool engine or a multi-spool engine having any number of spools. In one form, engine 10 is a turbofan engine, wherein fan system 12 includes a plurality of fan stages (not shown). In other embodiments, engine 10 may be another type of gas turbine engine, such as a turbojet engine, a turboshaft engine or a turboprop engine, or a turbofan engine having only a single fan stage.

Fan system 12 is operative to pressurize air received into engine 10, some of which is directed into compressor system 16 as core flow. The balance of the air pressurized by fan system 12 is directed into a bypass duct system (not shown) and discharged by turbofan engine 10 to generate thrust. In one form, fan system 12 includes two fan stages (not shown). In other embodiments, a greater or lesser number of fan stages may be employed.

Intermediate frame 14 is operative to direct air pressurized by fan system 12 toward compressor system 16, and to transmit engine 10 mechanical loads to an engine mount system 22, such as an intermediate engine mount. Although depicted as being disposed between fan system 12 and compressor system 16, it will be understood that in other embodiments intermediate frame 14 may take other forms and/or may be located in other positions. For example, in other embodiments, intermediate frame 14 may be located between compressor 16 and combustor 18; between combustor 18 and turbine system 20; and/or may be considered a portion of compressor system 16 or turbine system 20, and/or may house all or a portion of one or more of fan system 12, compressor system 16, combustor 18 and turbine system 20.

Compressor system 16 is operative to compress the core flow discharged by fan system 12. In one form, compressor system 16 includes two multi-stage compressors (not shown), each of which includes a plurality of blades and vanes in a plurality of stages for compressing air received by compressor system 16. In other embodiments, compressor system 16 may be in the form of a single multi-stage compressor. In still other embodiments, compressor system 16 may include more than two compressors, e.g., a low pressure (LP) compressor, an intermediate pressure (IP) compressor and a high pressure (HP) compressor.

Combustor 18 is in fluid communication with compressor system 16. Combustor 18 is operative add fuel and combust air pressurized by compressor system 16.

Turbine system 20 is in fluid communication with combustor 18. Turbine system 20 operative to expand the hot gases received from combustor 18 and to extract energy therefrom to drive compressor system 16 and fan system 12.

In one form, turbine system 20 includes two turbines, i.e., an LP turbine and an HP turbine. In other embodiments, a greater or lesser number of turbines may be employed. Each turbine includes one or more stages of blades and vanes.

Figure 2:
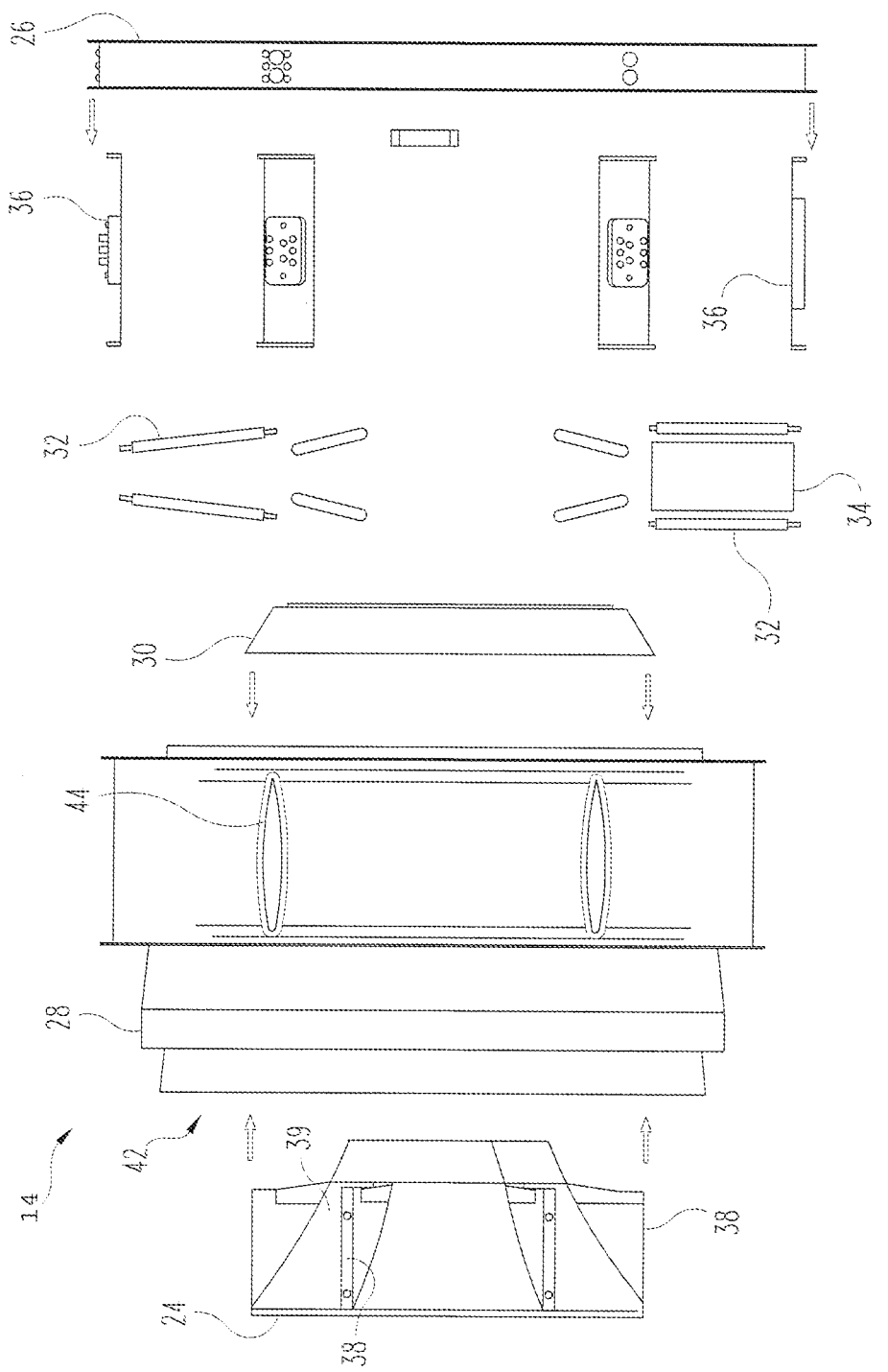
FIG. 2 is an exploded side view of an intermediate frame for a gas turbine engine in accordance with an embodiment of the present invention.

Referring now to FIG. 2, an exploded view of a non-limiting example of intermediate frame 14 is depicted and described. Intermediate frame 14 includes a metallic inner hub 24, a metallic outer construction 26, a composite flowpath 28, a metallic flange 30, a plurality of service tubes 34, a plurality of metallic struts 32 and a plurality of strut caps 36.

Metallic inner hub 24 is a structural component of intermediate frame 14 and houses, for example, a bearing sump and a gearbox, for which metallic inner hub 24 provides structural support. In one form, the bearing sump includes mainshaft bearings, such as rolling element bearings, that support all or part of one or more engine 10 rotors. Metallic inner hub 24 is formed of a metallic material, such as a titanium, aluminum or magnesium alloy.

Metallic inner hub 24 includes a plurality of strut pedestals 38 and a contoured outer surface 39. Strut pedestals 38 extend outward from contoured outer surface 39. In one form, strut pedestals 38 extend radially outward from contoured outer surface 39. In other embodiments, strut pedestals may extend outward from contoured outer surface 39 in other fashions, e.g., tangentially from contoured outer surface 39 or tangentially from a reference diameter. Strut pedestals 38 are configured for engagement with service tubes 34 and metallic struts 32. In one form, strut pedestals 38 and outer surface 39 are part of an integral unit forming metallic inner hub 24. In other embodiments, strut pedestals 38 and/or outer surface 39 may be formed as separate components and assembled together to form metallic inner hub 24. In one form, outer surface 39 is generally parallel to an inner flowpath wall inside intermediate frame 14 (e.g., inner wall 52 of composite flowpath 28, described below). In other embodiments, outer surface 39 may form part of the inner flowpath surface.

Metallic outer construction 26 is formed of a metallic material, such as a titanium, aluminum or magnesium alloy. Metallic outer construction 26 is adapted to interface with strut caps 36 and with engine mount system 22. Metallic outer construction 26 is operative to maintain the circumferential orientation of metallic struts 32 and service tubes 34. Metallic outer construction is also operative to transmit engine 10 mechanical loads to engine mount system 22.

Composite flowpath 28 is radially disposed between metallic inner hub 24 and metallic outer construction 26. Composite flowpath 28 is formed of a composite material. In one form, the composite material is a carbon bismaleimide composite. A non-limiting example of a carbon bismaleimide composite is Cycom 5250-4 BMI, commercially available from Cytec Industries Inc., headquartered in Woodland Park, N.J., USA. Other composite materials may be used in other embodiments, e.g., including ceramic matrix composites, metal matrix composites, organic matrix composites and/or carbon-carbon composites. In one form, composite flowpath 28 is formed via a resin transfer molding (RTM) process. In other embodiments, other manufacturing processes and techniques suitable for use in manufacturing composites may be employed in addition to or in place of RTM. In one form, composite flowpath 28 has a cavity 42 adapted to receive metallic inner hub 24.

Metallic flange 30 is adapted to interface with both composite flowpath 28 and with metallic inner hub 24. Metallic flange 30 is operative to secure composite flowpath 28 to metallic inner hub 24. Service tubes 34 and metallic struts 32 of intermediate frame 14 extend between metallic inner hub 24, e.g., strut pedestals 38, and outer construction 26. Metallic struts 32 are formed of a metallic material, such as a titanium, aluminum or magnesium alloy. Engine mechanical loads, such as rotor loads, inertial loads and engine weight loads are reacted by metallic inner hub 24 for transmission to engine mount system 22 via strut pedestals 38. Strut pedestals 38 transmit the mechanical loads from metallic inner hub 24 into metallic struts 32.

Strut caps 36 are adapted to interface with, service tubes 34 and metallic outer construction 26, and may also include interface features for connection to engine externals, such as tubing and a wiring harness. Metallic struts 32 transmit the mechanical loads to metallic outer construction 26 via strut caps 36. The loads are transmitted from metallic outer construction 26 to mount system 22.

Strut pedestals 38 and strut caps 36 are adapted to interface with service tubes 34. Service tubes 34, which may also be referred to as transfer tubes, provide passages between metallic inner hub 24 and metallic outer construction 26 for the provision of services to and from metallic inner hub 24. For example, in some embodiments, service tubes 34 are structured to conduct one or more of pressurized lube oil, scavenge oil, seal charging air, sump vent air, cooling air, one or more sensors, one or more shafts, such as a tower shaft 40 for transmitting power to an accessory gearbox, and/or one or more communications links and/or power cables between metallic inner hub 24 and metallic outer construction 26. The communications links include, for example, wired and/or optical links to transmit sensor data and/or control inputs, as well as wired links to transmit electrical power. In one form, service tubes 34 are fitted on either end into holes in metallic inner hub 24 and strut caps 36, and are sealed, e.g., with an o-ring or gasket.

Figure 3:
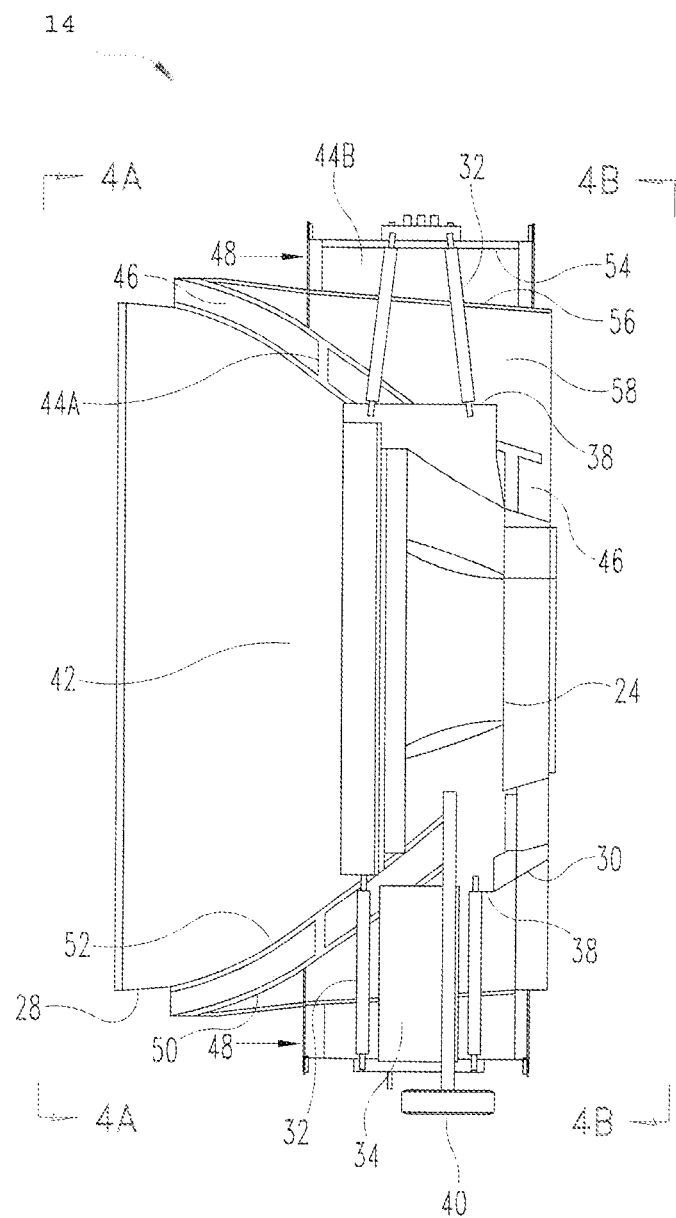
FIG. 3 is a cross section of the intermediate frame of FIG. 2.

Referring now to FIGS. 3, 4A and 4B, the exemplary intermediate frame of FIG. 2 is depicted as assembled. FIG. 3 is a cross section of intermediate frame 14, and FIGS. 4A and 4B are end views of intermediate frame 14.

Composite flowpath 28 is disposed radially between metallic inner hub 24 and metallic outer construction 26. Composite flowpath 28 defines flowpaths for the working fluid of engine 10. A flowpath is a passageway that channels bulk working fluid flow through engine 10, i.e., core airflow and bypass airflow, as opposed to fluid passages that transmit relatively small quantities of fluids, e.g., cooling air, pressure balance air, vent air and seal charging air, such as service tubes 34. As illustrated in FIG. 3, composite flowpath 28 defines both a primary flowpath 46 and a secondary flowpath 48. In other embodiments, a greater or lesser number of flowpaths may be defined by composite flowpath 28. In one form, secondary flowpath 48 is disposed radially outward of primary flowpath 46, although other arrangements may be employed in other embodiments. In one form, primary flowpath 46 is operative to conduct fan system 12 discharge flow to compressor system 16, and secondary flowpath 48 is operative to conduct fan system 12 discharge flow as a bypass flow.

Composite flowpath 28 includes a composite primary flowpath outer wall 50 and a composite primary flowpath inner wall 52 spaced apart from outer wall 50. Inner wall 52 is disposed radially inward of outer wall 50. Outer wall 50 and inner wall 52 define primary flowpath 46. Composite flowpath 28 also includes a composite secondary flowpath outer wall 54 and a composite secondary flowpath inner wall 56 spaced apart from outer wall 54. Inner wall 56 is disposed radially inward of outer wall 54. Outer wall 54 and inner wall 56 define secondary flowpath 48.

Composite flowpath 28 includes a plurality of hollow composite struts 44. Composite struts 44 are subdivided two groups: inner composite struts 44A and outer composite struts 44B. In one form, inner composite struts 44A and outer composite struts 44B are hollow. In other embodiments, some or all of inner composite struts 44A and outer composite struts 44B may be solid.

Composite struts 44A extend between composite primary outer wall 50 and composite primary inner wall 52. Composite struts 44A are adapted to receive strut pedestals 38, metallic struts 32 and service tubes 34. Composite struts 44B extend between composite secondary flowpath outer wall 54 and composite secondary flowpath inner wall 56. Composite struts 44B are adapted to receive metallic struts 32 and service tubes 34. In one form, composite flowpath 28 is integrally formed as a unitary single piece structure, including outer wall 50, inner wall 52, outer wall 54, inner wall 56, and composite struts 44A and 44B. In other embodiments composite flowpath 28 may be in the form of discrete composite components that are assembled together.

Composite flowpath 28 and metallic inner hub 24 are adapted to interface and transmit aerodynamic loads on composite flowpath 28 to metallic inner hub 24. For example, loads resulting from pressures and flows in primary flowpath 46 and secondary flowpath 48 are transmitted to metallic inner hub 24. In addition loads resulting from the pressures in cavities of composite flowpath 28, e.g., cavity 42 and a cavity 58 disposed between primary flowpath outer wall 50 and secondary flowpath inner wall 56, are transmitted to metallic inner hub 24. In one form, composite struts 44A and strut pedestals 38 are adapted to jointly form an interface for transmitting aerodynamic loads from composite flowpath 28 to metallic inner hub 24. In other embodiments, intermediate frame 14 may be configured to transmit aerodynamic loads from composite flowpath 28 to other structures, such as contoured outer surface 39 or a face of metallic hub 24, one or more of metallic struts 32 and/or metallic outer construction 26.

In one form, intermediate frame 14 is assembled by inserting inner metallic hub 24 into cavity 42 of composite flowpath 18. Composite flowpath 28 is secured onto metallic inner hub 24 with metallic flange 30. For example, in some embodiments, metallic flange 30 is bolted onto metallic inner hub 24 to clamp composite flowpath 28 between metallic inner hub 24 and metallic flange 30. Metallic struts 32 and service tubes 34 are inserted into composite struts 44 for interface with metallic inner hub 24, e.g., via strut pedestals 38. Strut caps 36 are then installed over metallic struts 32 and service tubes 34. Metallic outer construction 26 is then assembled over strut caps 36 and secured to strut caps 36, e.g., using bolts (not shown).

Metallic inner hub 24, metallic struts 32 and metallic outer construction 26, as assembled, form a loadpath that transfers engine mechanical loads between metallic inner hub 24 and metallic outer construction 26, and from metallic outer construction to engine mount system 22. The loadpath passes through the metallic structures of intermediate frame 14, and bypasses composite flowpath 28. By being divorced from the loadpath, composite flowpath 28 does not require the strength of metallic materials, which allows the use of composite materials to form flowpath 28, which may in some embodiments reduce the weight of intermediate frame 14 relative to similar structures formed solely or primarily of metallic materials.

Embodiments envisioned include a gas turbine engine frame, including a metallic inner hub; a metallic outer construction; and a composite flowpath disposed between the metallic inner hub and the metallic outer construction, the composite flowpath defining a primary flowpath for a working fluid of the gas turbine engine.

In a refinement, the gas turbine engine frame also includes metallic struts extending between the metallic inner hub and the metallic outer construction, wherein the metallic inner hub, the metallic struts and the metallic outer construction are assembled to form a loadpath to transfer engine mechanical loads between the metallic inner hub and the metallic outer construction. In another refinement, the loadpath bypasses the composite flowpath. In a further refinement, the gas turbine engine frame is structured to transmit aerodynamic loads from the composite flowpath to one of the metallic inner hub, the metallic struts and the metallic outer construction.

In another refinement, the composite flowpath is formed as a single piece structure.

In yet another refinement, the composite flowpath includes a composite inner flowpath wall and a composite outer flowpath wall spaced apart from the composite outer flowpath wall, and wherein the composite inner flowpath wall and the composite outer flowpath wall define the primary flowpath. In one form, the composite flowpath includes a plurality of composite struts, wherein at least a portion of each composite strut extends between the composite inner flowpath wall and the composite outer flowpath wall. In a refinement, the composite inner flowpath wall, the composite outer flowpath wall and the plurality of composite struts are integrally formed.

Embodiments also include a gas turbine engine, including a compressor; a turbine; and an engine frame, the engine frame including a metallic load-bearing structure and a composite flowpath, wherein the metallic load-bearing structure defines a loadpath operative to transmit engine mechanical loads to an engine mount of the gas turbine engine, and wherein the composite flowpath is divorced from the loadpath.

In a refinement, the composite flowpath defines a primary flowpath for a working fluid of the gas turbine engine. In a further refinement, the composite flowpath includes a primary flowpath outer wall and a primary flowpath inner wall disposed radially inward of the primary flowpath outer wall, wherein the primary flowpath outer wall and the primary flowpath inner wall define the primary flowpath.

In another refinement, the composite flowpath further defines a secondary flowpath for the working fluid of the gas turbine engine. In one form, the composite flowpath includes a secondary flowpath outer wall and a secondary flowpath inner wall disposed radially inward of the secondary flowpath outer wall, and wherein the secondary flowpath inner wall and the secondary flowpath outer wall define the secondary flowpath. In a refinement, the composite flowpath includes a composite strut extending through the secondary flowpath. In another refinement, the metallic load-bearing structure includes a metallic strut disposed within the composite strut, wherein the metallic strut is operative to transmit the engine mechanical loads through the secondary flowpath.

In another refinement, the metallic load-bearing structure includes a metallic inner hub disposed radially inward of the composite flowpath; a metallic outer construction disposed radially outward of the composite flowpath; and a metallic strut extending between the metallic inner hub and the metallic outer construction.

In yet another refinement, the gas turbine engine includes a service tube extending between the metallic inner hub and the metallic outer construction, wherein the service tube is structured to conduct between the metallic inner hub and the metallic outer construction at least one of pressurized lube oil; scavenge oil, seal charging air; sump vent air, cooling air, a sensor, and a communications link. In one form, the composite flowpath includes a composite strut disposed at least partially around the service tube. In one form, the composite flowpath is formed as a single piece structure.

In still another refinement, the composite flowpath includes a composite strut disposed at least partially around the metallic strut.

Embodiments also include a gas turbine engine, including a compressor; a turbine; and an engine frame, the engine frame including composite means for defining a primary flowpath for a working fluid of the gas turbine engine; and means for transmitting engine mechanical loads to an engine mount of the gas turbine engine, wherein the composite means are divorced from the engine mechanical loads.

In a refinement, the engine frame also includes composite means for defining a secondary flowpath for the working fluid of the gas turbine engine.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A gas turbine engine frame, comprising:
   a metallic inner hub;
   a metallic flange;
   a metallic outer construction; and
   a composite flowpath structure comprising a primary flowpath structure disposed between the metallic inner hub and the metallic outer construction, wherein the composite flowpath structure includes at least one of carbon bismaleimide composites, ceramic matrix composites, metal matrix composites, organic matrix composites or carbon-carbon composites, and wherein the metallic flange is configured to secure the composite flowpath structure to the metallic inner hub;
   wherein the primary flowpath structure comprises a primary composite outer flowpath wall and a primary composite inner flowpath wall spaced radially apart from the primary composite outer flowpath wall, and the primary composite outer flowpath wall and the primary composite inner flowpath wall together define the primary flowpath structure for a working fluid of the gas turbine engine;
   wherein the primary flowpath structure is configured to direct the working fluid to a compressor of a gas turbine engine; and
   wherein the composite flowpath structure further comprises a plurality of inner composite struts, wherein at least a portion of each inner composite strut extends between the primary composite inner flowpath wall and the primary composite outer flowpath wall.

2. The gas turbine engine frame of claim 1, further comprising metallic struts extending between the metallic inner hub and the metallic outer construction, wherein the metallic inner hub, the metallic struts and the metallic outer construction are assembled to form a loadpath to transfer engine mechanical loads between the metallic inner hub and the metallic outer construction.

3. The gas turbine engine frame of claim 2, wherein the loadpath bypasses the composite flowpath structure, and wherein the composite flowpath structure is configured to be divorced from mechanical loads transferred between the metallic inner hub and the metallic outer construction.

4. The gas turbine engine frame of claim 2, wherein the gas turbine engine frame is structured to transmit aerodynamic loads from the composite flowpath structure to one of the metallic inner hub, the metallic struts and the metallic outer construction.

5. The gas turbine engine frame of claim 1, wherein the composite flowpath structure is formed as a single piece structure.

6. The gas turbine engine frame of claim 1, wherein the composite flowpath structure and the plurality of inner composite struts are integrally formed.

7. The gas turbine engine frame of claim 1, wherein the composite flowpath structure includes a secondary flowpath structure disposed radially outward of the primary flowpath structure, wherein the secondary flowpath structure includes a secondary composite inner flowpath wall spaced radially apart from a secondary composite outer flowpath wall to define the secondary flowpath structure for working fluid of the gas turbine engine; and
   a plurality of outer composite struts wherein at least a portion of each outer composite strut extends between the secondary composite inner flowpath wall and the secondary composite outer flowpath wall.

8. A gas turbine engine, comprising:
   a fan system;
   a compressor;
   a turbine; and
   an engine frame, the engine frame disposed between the fan system and the compressor, the engine frame including a metallic load-bearing structure and a composite flowpath structure, wherein the composite flowpath structure is a separate component from the metallic load-bearing structure, wherein the metallic load-bearing structure defines a loadpath operative to transmit engine mechanical loads to an engine mount of the gas turbine engine, and wherein the composite flowpath structure is divorced from the loadpath, wherein the composite flowpath structure includes at least one of carbon bismaleimide composites, ceramic matrix composites, metal matrix composites, organic matrix composites or carbon-carbon composites;
   wherein the composite flowpath structure includes a primary composite inner wall spaced apart from a primary composite outer wall to define a primary inner flowpath structure configured to direct a working fluid of the gas turbine engine to the compressor of the gas turbine engine;

wherein the composite flowpath structure further defines a secondary flowpath structure for the working fluid of the gas turbine engine; and wherein the secondary flowpath structure includes a secondary composite outer wall and a secondary composite inner wall disposed radially inward of the secondary composite outer wall.

9. The gas turbine engine of claim 8, wherein the composite flowpath structure includes a composite strut extending through the secondary flowpath structure.

10. The gas turbine engine of claim 9, wherein the metallic load-bearing structure includes a metallic strut disposed within the composite strut, and wherein the metallic strut is operative to transmit the engine mechanical loads through the secondary flowpath structure.

11. The gas turbine engine of claim 8, wherein the metallic load-bearing structure includes:
a metallic inner hub disposed radially inward of the composite flowpath structure;
a metallic outer construction disposed radially outward of the composite flowpath structure; and
a metallic strut extending between the metallic inner hub and the metallic outer construction.

12. The gas turbine engine of claim 11, further comprising a service tube extending between the metallic inner hub and the metallic outer construction, wherein the service tube is structured to conduct between the metallic inner hub and the metallic outer construction at least one of: pressurized lube oil; scavenge oil; seal charging air; sump vent air; cooling air; a sensor; and a communications link.

13. The gas turbine engine of claim 12, wherein the composite flowpath structure includes a composite strut disposed at least partially around the service tube.

14. The gas turbine engine of claim 11, wherein the composite flowpath structure includes a composite strut disposed at least partially around the metallic strut.

15. The gas turbine engine of claim 8, further comprising at least one composite strut extending between the spaced apart composite primary flowpath structure walls.

16. The gas turbine engine of claim 8, wherein the metallic load-bearing structure includes an engine mount and a metallic inner hub, and wherein the composite flowpath structure is configured to be divorced from engine mechanical loads transmitted from the metallic inner hub to the engine mount.

17. A gas turbine engine, comprising:
a compressor;
a turbine; and
an engine frame, the engine frame including:
inner and outer primary composite walls defining a composite primary flowpath structure for a working fluid of the gas turbine engine, wherein the composite primary flowpath structure includes at least one of carbon bismaleimide composites, ceramic matrix composites, metal matrix composites, organic matrix composites or carbon-carbon composites;
a means for transmitting engine mechanical loads to an engine mount of the gas turbine engine, wherein the means for transmitting engine mechanical loads includes an inner metallic hub,
wherein the composite primary flowpath structure is a separate component from the metallic inner hub,
wherein a metallic flange secures the composite flowpath structure to the metallic inner hub, and
wherein the composite primary flowpath structure is divorced from the engine mechanical loads, and wherein the composite primary flowpath structure is configured to direct the working fluid to the compressor of the gas turbine engine; and
inner and outer secondary composite walls defining a secondary flowpath structure for a working fluid of the gas turbine engine;
wherein the secondary flowpath structure is positioned radially outward of the primary flowpath structure.

18. The gas turbine engine of claim 17, further comprising an inner composite strut connected between the inner and outer primary composite walls; and
an outer composite strut connected between the inner and outer secondary composite walls.

19. The gas turbine engine of claim 17, wherein the primary flowpath structure and the secondary flowpath structure are configured to be divorced from engine mechanical loads transferred from the inner metallic hub to the engine mount.

* * * * *